United States Patent [19]

Blanding

[11] 4,017,897
[45] Apr. 12, 1977

[54] MAGNETIC TAPE GUIDE HAVING A TAPERED ROLLER AND AN ADJUSTABLE CONTOURED EDGE

[75] Inventor: Douglass L. Blanding, Leroy, N.Y.

[73] Assignee: Eastman Kodak Company, Rochester, N.Y.

[22] Filed: Sept. 17, 1975

[21] Appl. No.: 614,720

[52] U.S. Cl. .................. 360/85; 226/199; 242/55.19 A; 242/76; 360/95; 360/130

[51] Int. Cl.² ............... G11B 15/60; G11B 23/04; B65H 23/32

[58] Field of Search .............. 360/132, 85, 95, 92, 360/130, 84; 226/199, 196, 198, 183, 184; 242/76, 55.19 A, 193–194

[56] References Cited

UNITED STATES PATENTS

| | | | |
|---|---|---|---|
| 2,706,638 | 4/1955 | Bruderlin | 360/90 |
| 3,263,936 | 8/1966 | Williams | 242/55.19 A |
| 3,269,628 | 8/1966 | Tarver | 226/199 |
| 3,643,849 | 2/1972 | Roberts | 226/199 |
| 3,665,120 | 5/1972 | Larkin | 360/85 |
| 3,673,348 | 6/1972 | Larkin | 360/85 |
| 3,684,208 | 8/1972 | Larsen | 360/132 |
| 3,864,742 | 2/1975 | Katoh | 360/85 |

Primary Examiner—Alfred H. Eddleman
Attorney, Agent, or Firm—Robert F. Cody

[57] ABSTRACT

A tapered roller guide, provided for use with a helical-scan tape recorder, is rotatably mounted on a stationary guide post for guidedly inclining a magnetic tape toward or away from a helical path around a recording drum. A contoured edge guide provided on the guide post supports the edge of the tape as it wraps around the roller and changes its inclination and direction of travel. By providing for an arcuate adjustment of the contoured edge guide, the tape may be precisely guided into a predetermined helical path around the recording drum.

15 Claims, 8 Drawing Figures

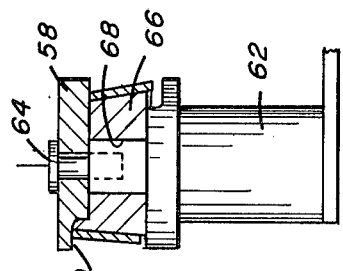
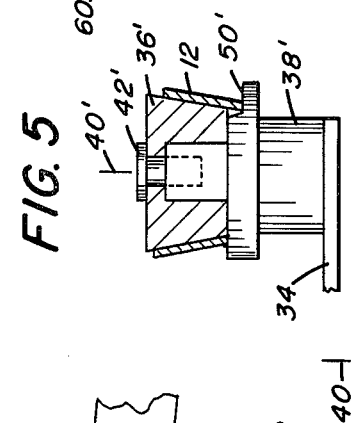
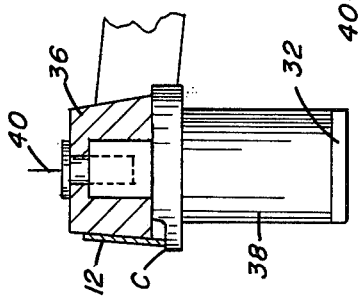
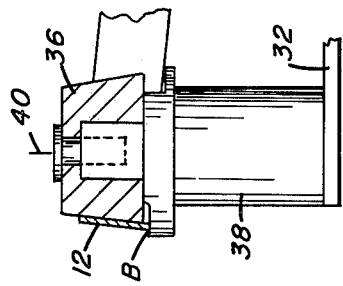
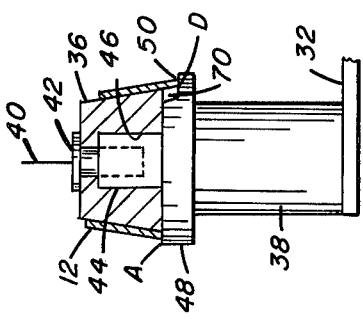
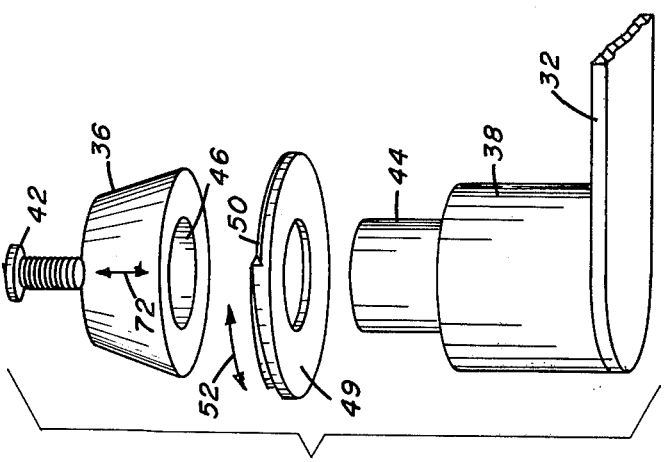
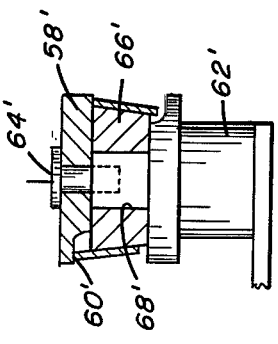

MAGNETIC TAPE GUIDE HAVING A TAPERED ROLLER AND AN ADJUSTABLE CONTOURED EDGE

CROSS-REFERENCE TO RELATED APPLICATIONS

The following application is related: U.S. patent application Ser. No. 606,994, filled Aug. 22, 1975, entitled "Yieldable, Coaxially-Driven Tape Wrapping Guides for Use in a Helical Tape Recorder," by Douglass L. Blanding.

BACKGROUND OF THE INVENTION

1. Field of the Invention

This invention relates in general to apparatus for guiding a tape through a tape path in a tape recorder; more particularly, the invention is concerned with tape guides for changing the direction and inclination of the path of a magnetic tape in a magnetic tape recorder.

2. Description Relative to the Prior Art

While it is not so restricted, the invention acquires a special significance when it is used in a video tape recorder to guide a magnetic tape toward and away from a helical recording drum carrying one or more rotating heads. The tape is curved around the recording drum so that it emerges from the drum at a different level from that at which it entered, describing a helical path as it travels around the drum. With the tape accordingly placed around the drum, a television signal train may be provided to the heads and helically recorded on the tape. However, the helical recording format requires precise positioning of the span of tape which passes around the drum; positioning errors may cause, for example, mistracking during playback. Tracking problems are diminished therefore, if the tape follows a precise path into, around, and out of the drum assembly.

While the tape guide of this invention is generally applicable to tape recorders, it is particularly well adapted for use with one frequently used video recorder configuration in which the tape is initially pulled from a coaxial-reel cassette and wrapped around the recording drum. In this configuration, the paths into and out of the drum are horizontal and substantially in the same plane as supply and takeup reels coaxially mounted in the cassette. The last post before the tape touches the drum and the first post after the tape leaves the drum are designed to change the tape's horizontal level a few degrees so as to dispose the tape properly to form a helix around the drum.

Tape guides have been proposed for changing the direction and inclination of magnetic tape within a coaxial-reel cassette. One form of guide is exemplified by U.S. Pat. No. 3,684,208. In their most common form, these guides include rotatable truncated cones for guiding magnetic tape along an inclined path from the level of one coaxial reel to the level of the other coaxial reel. The taper of each cone causes the tape to incline in the direction of the increasing radii of its conical surface. Since the tape tends to move transversely along the cone's surface, flanges are formed integrally with the cone to restrain the tape and prevent it from riding off the guide. These flanges must rotate with the cone; this means the flanges must be so disposed with respect to the rotation axis of the guide that the tape contacts the flanges only during a certain portion of its angular wrap around the rotating guide. Otherwise, if the line of contact varies, the tape will be intermittently bumped and distortions or vibrations will be established along the length of the tape. This situation is most simply avoided by mounting the flanges so that the planes that they describe are perpendicular to the rotation axis of the guides; in other words, the flanges are normal, and not contoured, with respect to the axes of the conical surfaces.

The guides thus far described have edges which do not contribute significantly to changing the inclination of the tape path. Edges which do contribute are illustrated in U.S. Pat. No. 3,263,936. These guides, representing an alternative approach to guiding a tape past a tapered surface, provide contoured guide surfaces to achieve the level offset between two coaxial reels. Edges, integrally formed on the guides, locate the tape in a vertical direction and follow the inclination of the tape as it rounds the guide surface. However, to prevent the vibration or distortion mentioned above in connection with rotating guides, the guides and their associated edges must both be rigidly mounted in the cassette so as not to rotate with tape movement. Otherwise, intermittent vibration of the tape would render them useless.

Apparatus has been devised for automatically wrapping a tape around a drum of a video cassette machine. The cassette, containing the tape inside, is first inserted into the machine. Generally, a tape door is automatically opened to allow one or more tape threading guides to be placed within the cassette and close to the tape. Each tape threading guide is adapted to engage the tape within the cassette and to pull the tape out of the cassette and toward the recording drum. The tape is then guidedly curved around the drum so that it forms a helix angle with the arcuate path of one or more recording heads. Each tape threading guide has a guiding surface with an orientation that encorages the tape to form a helix around the drum. For example, in U.S. Pat. No. 3,665,120, a guide having a conical outer surface is rigidly mounted on a movable support plate for engaging a magnetic tape within a cassette and for pulling the tape out and around a recording drum. The conical surface is sufficiently tilted so that the tape is held against its tendency to laterally drift along the guides as it changes its direction and inclination of travel.

SUMMARY OF THE INVENTION

In order to provide a guide having a guiding surface and a guiding edge which both significantly contribute to changing the direction and inclination of a magnetic tape, the invention includes, in one aspect, a rotatable tapered surface to guidedly alter the inclination and direction of the tape and a contoured stationary edge guide to guidedly control and support an edge of the magnetic tape as it changes direction and inclination around the rotatable conical surface. The contour is so disposed as to match the changing inclination of the tape during the full length of its wrap around the tapered surface. In a presently preferred form of the invention, the tapered surface is conical and the contoured edge forms a spiral path in a ledge adjacent one end of the conical surface.

By supporting a rotatable tapered surface and a stationary edge guide on each movable tape threading guide, it becomes possible, in a second aspect of the invention, to arcuately adjust the stationary edge guide around the circumference of the tapered surface and relative to the angular wrap of the tape. By making this adjustment, it is ensured that the stationary edge guide is positioned correctly so that it will cooperate properly with the tapered roller.

Furthermore, by additionally providing a stationary cap having a contoured edge for guiding the opposite edge of the tape, the tape is prevented from laterally wandering off the conical surface when the direction of tape travel is reversed during tape rewind.

BRIEF DESCRIPTION OF THE DRAWINGS

The invention will be described with reference to the figures, wherein:

FIGS. 2, 3, and 4 are various elevation views of one rotatable guide and the stationary edge as pictured in FIG. 1 and taken along llines 2—2, 3—3 and 4—4, respectively;

FIG. 5 is an elevation view of another guide pictured in FIG. 1 and taken along line 5—5;

FIGS. 6 and 7 are elevation views showing another embodiment of the invention; and FIG. 8 is an exploded perspective view of an embodiment of the adjustable edge guide of the invention.

DESCRIPTION OF THE PREFERRED EMBODIMENTS

Figure 1:
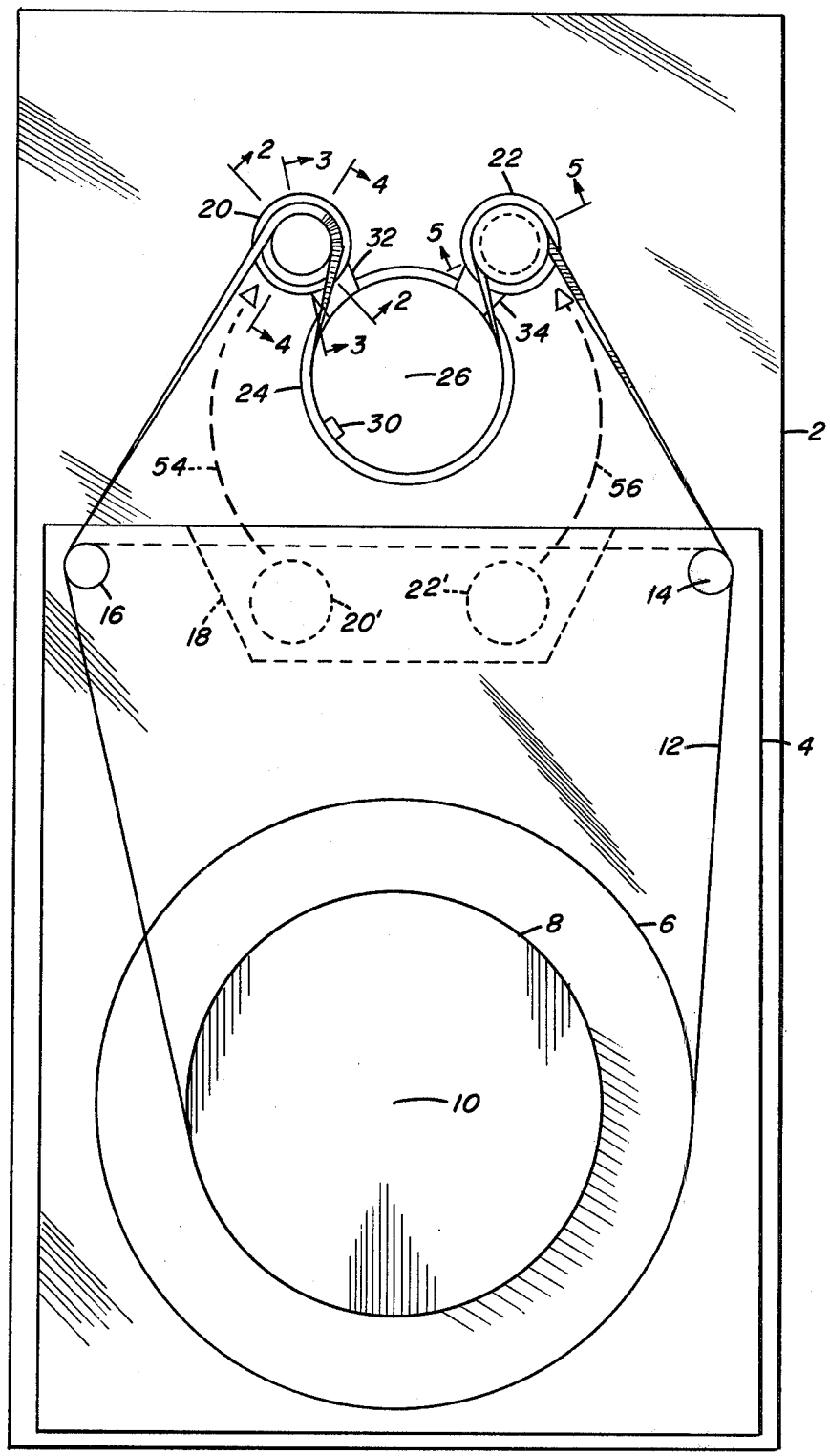
FIG. 1 is a top view of a tape recorder incorporating a presently preferred embodiment of the invention.

Because helical tape recorders are well known, particularly in connection with video recording, the present description will be directed in particular to elements forming part of, or cooperating more directly with, the present invention. Recorder elements not specifically shown or described herein may be selected from those known in the art.

Referring specifically to FIG. 1, there are shown the parts of a helical video recorder which are sufficent for an understanding of the present invention. A helical tape recorder 2 is provided with space on its playing deck for accepting a coaxial-reel cassette 4. A supply reel 6 and a takeup reel 8 are coaxially disposed with relation to each other and supported for rotation within the cassette 4 about an axis 10. A magnetic tape 12 leaves the supply reel 6 and passes across guides 14 and 16 during the course of its travel to the takeup reel 8.

The cassette 4 has a cutaway front face 18, hereinafter sometimes referred to as a window, which is so designed as to permit the positioning of a pair of threading guides 20 and 22, also referred to as tape wrapping guides, behind the tape 12. The threading guides 20 and 22 are rigidly mounted on arms 32 and 34, which in turn are supported on a drive assembly 24 for rotational movement around an axis 26. The drive assembly 24 is described in detail in copending application Ser. No. 606,994, filed Aug. 22, 1975, in the name of Douglass L. Blanding, and assigned to the same assignee as the present application. Reference is made to the copending application for a more specific description of the structure, function, and operation of the drive assembly. To reiterate those points sufficient for an understanding of the present invention, the drive assembly 24 is adapted to rotate the tape threading guides 20 and 22 from the unwrapped position, depicted by broken lines at 20' and 22', to the wrapped position, depicted by solid lines at 20 and 22, and back again. After the wrapping and unwrapping motions are completed, a suitable switch or motor control unit disables the drive assembly. A recording drum 28 is provided carrying at least one recording head 30 which is also rotatable about the axis 26. The path of the recording head 30 is slanted with respect to the tape 12 so that television signals supplied to the recording head 30 may be obliquely recorded on the tape 12 when it is wrapped helically around the drum 28 by the movment of the wrapping guides 20 and 22.

As better seen in FIGS. 2, 3, and 4, the guide 20 includes a conically shaped roller 36 supported on a stationary post 38 for rotation about an axis 40. A screw 42 holds the roller 36 to a shank 44 of the post 38 for rotation about the axis 40. The shank 44 is formed so as to extend into a hollowed-out recess 46 of the roller 36. The post 38 further has an underlying ledge 48 which is partially cut away to form a spiral-like edge 50 which is spirally spaced from one end of the roller 36. The edge 50 nearly abuts the roller 36 in its uppermost position A, shown in FIG. 2, and spirally works away from the roller 36 through positions B (FIG. 3) and C (FIG. 4) until it reaches its lowermost tape-contacting position D (FIG. 2). The contour of the edge 50 is so chosen as to exactly follow the path of the tape 12 as it passes around the conical surface of the roller 36.

FIG. 5 depicts an elevation of the tape wrapping guide 22, showing a conical roller 36' supported for rotation on a stationary post 38' about an axis 40', the post 38' being similar to but shorter than the post 38. An edge 50' is disposed on the post 38' so as to follow the edge of the tape 12 as it rounds the surface of the roller 36'. The roller 36' is formed from a tapered surface having radii which gradually increase in the axial direction defined as being toward the level of the takeup reel 8; likewise, the radii of the roller 36 gradually increase in the opposite direction defined as being toward the level of the supply reel 6. The use of a truncated cone for rollers 36 and 36' is a matter of preferred choice; other tapered surfaces may be substituted, though they probably would not work as well.

In an additional refinement of the invention, FIG. 8 illustrates the wrapping guide 20 provided with an adjustable ledge 49 in which the edge 50 is formed. The ledge 49 is rotatably attached to the post 38 so that it may be adjusted in either direction of the arrow 52. Frictional contact between the post 38 and the ledge 49 is of sufficient magnitude that the passage of the edge of the tape 12 along the edge 50 will not angularly displace the ledge 49.

Once achieved, the edge may be permanently tightened so that the end user would not accidentally jar the edge guide. Although FIG. 8 illustrates the ledge 49 supported for adjustment on the post 38, it is also possible that the entire post illustrated in FIG. 2, with its integrally formed edge 50, may be similarly supported for adjustment on the arm 32.

Referring again to FIG. 1, the dotted guide positions 20' and 22' show the location of the tape threading guides 20 and 22 before the threading operation begins. When the drive assembly 24 is activated, the threading guides 20 and 22 are moved through arcuate paths 54 and 56 until they reach the positions illustrated in solid lines in FIG. 1. At this point, the tape is drawn away from the supply reel 6 and substantially maintains that level as it traverses the guide 14 and begins to wrap around the threading guide 22. The conical surface of the roller 36' is so disposed as to raise the inclination of the tape 12 upward toward the level of the takeup reel 8. The edge 50' is further disposed to guidedly support and control and tape 12 toward its helical path around the drum 28. To prevent the lateral wandering of the tape 12 across the roller 36', the edge 50' exactly follows the path of the edge of the tape 12 as it passes around the conical surface of the roller 36'.

Once onto the drum 28, the tape 12 follows a helical path with respect to a magnetic track traced by the rotating head 30. Coming off the drum 28, the tape 12 wraps around the threading guide 20, inclining opppositely to the incline imparted by the threading guide 22, until it leaves the roller 36 substantially at the level of the takeup reel 8. The stationary edge 50 guidedly supports and controls the tape 12 as it wraps about the roller 36. To prevent the lateral wandering of the tape 12 across the roller 36, the edge 50 exactly follows the path of the edge of the tape 12 as it passes around the conical surface of the roller 36. The tape 12 then traverses the guide 16 and winds onto the takeup reel 8.

The helical recorder configuration illustrated in FIG. 1 provides for rewinding of the tape 12 after it has been drawn back into the cassette 4 and after the tape threading guides have assumed the positions depicted by 20' and 22'. If it is desired to rewind the tape 12 while it remains wrapped around the threading guides 20 and 22 and the recording drum 28, caps 58 and 58' are provided for the guides 20 and 22, as shown in FIGS. 6 and 7, respectively. Without edge guiding at the top of the rollers 36 and 36', the tape 12 will raise off the stationary edges 50 and 50' during rewind and slip laterally across and off the rollers 36 and 36'. To prevent this, the caps 58 and 58' are ridgidly attached to the shank portion of posts 62 and 62' by screws 64 and 64'. Rollers 66 and 66' are therefore designed so tht hollowed-out recesses 68 and 68' extend completely through the rollers. The caps 58 and 58' have shoulders overlying the rollers 66 and 66' which have guiding edges 60 and 60' with a contour complementary to the edges 50 and 50'. As the tape 12 rides up against the caps 58 and 58' during rewinding, the edges 60 and 60' follow the edge of the tape 12 as it wraps around the rollers 66 and 66'. In this way, the tape 12 is guidedly supported and controlled during rewinding.

The tape 12 is controlled and supported throughout its change in direction and inclination around the tape threading guides 20 and 22 by the cooperation of the rollers 36 and 36' and the edges 50 and 50', respectively. In accordance with the invention, this cooperation is provided by contoured edges 50 and 50' which spiral away from the tapered guiding surfaces of rollers 36 and 36'. This gradual distancing of, for example, the edge 50 from the roller 36 leaves a cavity 70 (FIG. 2) behind the tape and between the roller 36 and the edge 50. While not a requirement of this invention, the cavity 70 is a matter of manufacturing convenience since the difficulty of providing a precisely formed corner to back up the tape is thereby surmounted. It has been found that the passage of the tape 12 around the roller 36 is not detrimentally affected by the presence of the small cavity 70.

In addition to the embodiment thus far described, the invention contemplates a tape guide which may be used wherever the tape needs to be guidedly inclined from one level to another. For example, some video cassette recorders employ a multiplicity of guides mounted, say, on a ring surrounding a recording drum. The tape is passed from one guide to another, gradually changing its inclination with respect to the drum. Any or all of these guides could be improved by the guide of this invention. Apart from cassette machines, guides fixed near a helical drum in a reel-to-reel recorder could advantageously incorporate the invention to direct the tape toward and away from the drum. In addition, such guides could be used within a coaxial-reel cassette to provide the change in tape level between the supply reel and the takeup reel.

The invention has been described in detail with particular reference to preferred embodiments thereof, but it will be understood that variations and modifications can be effected within the spirit and scope of the invention.

What is claimed is:

1. A tape guide for use with a tape recorder of the type wherein a tape is transported along a tape path having more than one level from a supply reel to a takeup reel, comprising:
   a post;
   a roller supported for rotation on said post in the path of the tape, said roller having a tapered guiding surface for guidedly inclining the tape from a first tape path level to a second tape path level, the tape further entering and exiting said tapered guidng surfaces at predetermined points. thereon and defining a curved tape path therebetween; and
   means arcuately disposed along a portion of the edge of said curved tape path, and adapted to be fixedly secured relative to said roller, for completely guiding an edge of the tape along the arcuate length of said means from said first tape path level to said second tape path level, said means extending radially outward from said post and adjacent one end of said roller for cooperaton with said tapered guiding surface.

2. The apparatus of claim 1 including means for relatively arcuately positioning said roller and said guide means.

3. The apparatus of claim 1 wherein said guiding means include edge means underlying said one of said roller and defining an edge path which spirally varies in distance from said tapered guiding surface.

4. For use with a helical-scan tape recorder of the type wherein a magnetic tape is helically wrapped around a drum for magnetic recording thereon, the recorder having a tape guide located in the path of the tape at a first level for so guidedly directng the tape with respect to the drum that the tape may be helically wrapped therearound, the tape guide comprising:
   a post, provided on the recorder, having an operative guiding position adjacent the drum;
   a roller supported for rotation on said post in the path of the tape at the first level, said roller having a concial guiding surface for engaging the tape at the first level and for directing a span of tape between said roller and the drum; and
   spiral edge guiding means provided on said post for continuously guiding a length of tape along an edge thereof adjacent said roller, said edge means adapted to be positionally fixed and non-rotatable relative to said roller during the passage of the tape therearound.

5. A tape guide for use with a helical-scan tape recorder of the type wherein a tape is helically curved around a recording drum, comprising:
   a roller having a conical surface for guidedly altering the inclination of the tape as it wraps therearound;
   a post adapted for positioning adjacent the drum, said roller supported for rotation on said post, said post further including an arcuate member underlying one end of said roller and forming a stationary ledge projecting beyond said concial surface; and a spiral-like edge guide formed on said ledge for engaging the tape adjacent thereto and continuously guiding the length of said tape along a edge thereof as the tape progressively alters its lateral position on said conical surface while wrapping therearound, said edge guide and said conical surface cooperating to guide the tape.

6. The apparatus as claimed in claim 5 wherein said spiral-like edge guide is acrcuately adjustable for accurately positioning said ledge in order to achieve optimum cooperation of said ledge and said conical surface.

7. The apparatus as claimed in claim 5 further comprising a cap rigidly supported on said post adjacent the other end of said roller, said cap including an arcuate member overlying said other end of said roller forming a shoulder projecting beyond said conical surface, said overlying portion having a spiral-like edge guide thereon for continuously guiding the other edge of the tape when the direction of tape travel is reversed.

8. For use in a helical-scan tape recorder of the type wherin a magnetic tape is pulled from a cassette by at least one tape wrapping guide and helically wrapped around a recording drum, the improvement wherein the tape wrapping guide comprises:

a roller supported for rotation on the tape wrapping guide, said roller having a tapered guiding surface for altering the level of the tape and for guiding the tape toward a helical path around the drum; and means spirally spaced from the axis of said roller for controlling an edge of the tape throughout its contact with said rotatable guiding surface, said means being stationary with respect to said rotatable guiding surface during the contact of the moving tape therewith.

9. The apparatus of claim 8 including the improvement wherein a second tape wrapping guide comprises:

a second roller supported for rotation on the second tape wrapping guide, said second roller having a second tapered guiding surface for guidedly receiving the tape from its helical path around the drum and for altering the level of the tape; and second means spirally spaced from the axis of said second roller for controlling an edge of the tape throughout its contact with said second rotatable guiding surface, said second means being stationary with respect to said second rotatable guiding surface during the contact of the moving tape therewith.

10. The apparatus of claim 8 wherein said spiral-like edge guide is arcuately adjustable for accurately positioning said ledge in order to achieve optimum cooperation of said ledge and said conical surface.

11. The apparatus of claim 9 wherein said spiral-like edge guide is arcuately adjustable for accurately positioning said ledge in order to achieve optimum cooperation of said ledge and said conical surface.

12. For use in a helical-scan recorder of the type wherein a magnetic tape is pulled from a coaxial-reel cassette by first and second tape threading members and wrapped into a helical path around a recording drum, the cassette having a first reel supported for rotation at a first level and a second reel supported for rotation at a second level parallel to the first level, the improvement wherein the tape threading members comprise:

a first roller guide supported for rotation on the first tape threading member, said first roller guide having a first tapered guiding surface for guidedly disposing the tape from the first level toward the helical path around the drum, said first tapered guiding surface having a cross-section whose radius gradually increases in the direction of the second level;

first edge means cooperating with said first roller guide for guiding an edge of the tape druing its path around said first tapered guiding surface, said first edge means provided on the first tape threading member, said first edge means further being stationary relative to said first tape threading member;

a second roller guide supported for rotation on the second tape threading member, said second roller guide having a second tapered guiding surface for guidedly disposing the tape from the helical path around the drum toward the second level, said second tapered guiding surface having a cross-section whose radius gradually increases in the direction of the first level; and second edge means cooperating with said second roller guide for guiding the edge of the tape during its path around said second tapered guiding surface, said second edge means provided on the second tape threading member, said second tape threading member.

13. The apparatus of claim 12 wherein said first and second edge means are supported on the first and second tape threading members, respectively, for arcuate adjustment therewith into a position wherein said first and second edge means provide uniform support to the edge of the tape as said tape passes around said first and second guiding surfaces, respectively.

14. Web guiding apparatus for combination with a coaxial-reel cassette of the type useful with a magnetic recording device, the cassette having supply and takeup reels mounted at separate levels, the reels having a span of web material extending therebetween, the cassette further having a window across which the web is adapted to extend, a. a first tapered guide roller mounted within the cassette for urging the web across the roller guide surface thereof from the level of the supply reel to a patch across the window; and b. a second tapered guide roller mounted within the cassette for urging the web across the roller guide surface thereof from said path across the window to the level of the takeup reel; the improvement wherein the web guiding apparatus further comprises:

edge guiding means cooperating with said first and second tapered guide rollers for guiding a length of the web along an edge thereof from the level of the supply reel to the level of the takeup reel, whereby said edge of the web is biased against said edge guiding means by the urging tendency of said first and second tapered guide rollers.

15. The apparatus of claim 14 in which said edge guiding means is provided between said first and second tapered guide rollers for guiding an edge of the web in said path across the window from the level of the supply reel to the level of the takeup reel.

* * * * *